G. G. & E. L. VOLAND.
WEIGHT PLACING AND PROVING ATTACHMENT.
APPLICATION FILED APR. 17, 1918.
1,301,765. Patented Apr. 22, 1919.
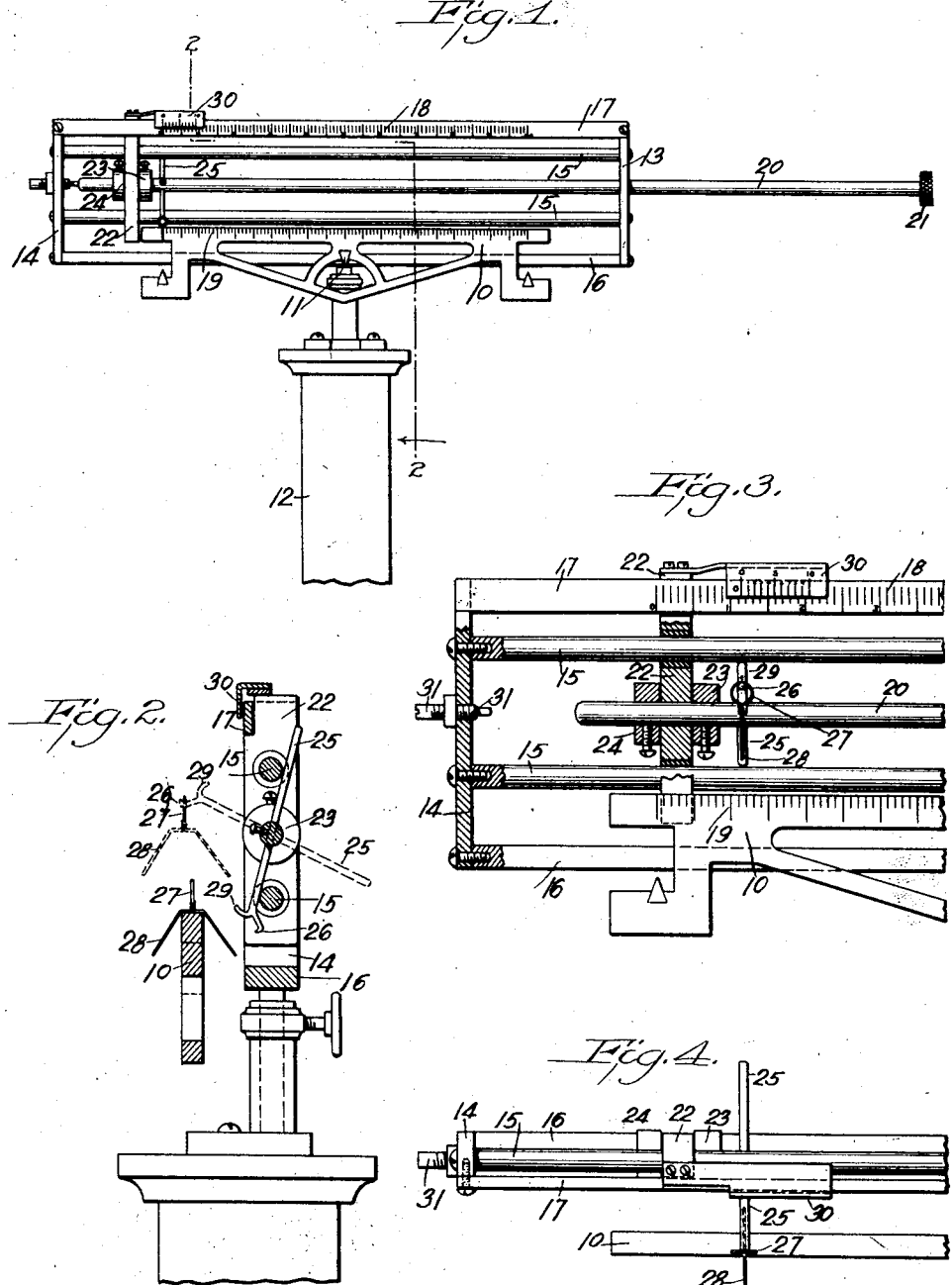
WITNESSES
INVENTORS
George G. Voland
Emil L. Voland
BY
ATTORNEYS

UNITED STATES PATENT OFFICE.

GEORGE G. VOLAND AND EMIL L. VOLAND, OF NEW ROCHELLE, NEW YORK.

WEIGHT PLACING AND PROVING ATTACHMENT.

1,301,765.  Specification of Letters Patent.  Patented Apr. 22, 1919.

Application filed April 17, 1918. Serial No. 229,072.

*To all whom it may concern:*

Be it known that we, GEORGE G. VOLAND and EMIL L. VOLAND, both citizens of the United States, and residents of New Rochelle, in the county of Westchester and State of New York, have invented a new and Improved Weight Placing and Proving Attachment, of which the following is a full, clear, and exact description.

Among the principal objects which the present invention has in view are: to indicate the placement of balancing weights on the balancing beam of a weighing scales; to show the fraction of the divisional space where a balancing weight member is placed in service; to prove the readings of a fractional unit weighing scales; and to facilitate the handling of the scales.

Drawings.

Figure 1 is a front view of a scalebeam and weight placing and indicating attachment therefor;

Fig. 2 is a detail view on an enlarged scale, showing in section the rocking beam and weight-placing attachment therefor, the section being taken as on the line 2—2 in Fig. 1;

Fig. 3 is a detail view on an enlarged scale showing fragments of the rocking beam, weight-placing and proving attachment, and a weight shown in the operation of being placed;

Fig. 4 is a top view of the same;

Fig. 5 is a perspective view of one of the balancing weights with which the scales is equipped.

Description.

As seen in the drawings, the scalebeam 10 is pivotally mounted on a knife blade 11 and supported by a pillar 12. Rigidly held on the pillar 12 is the weight-placing and proving attachment. The attachment consists primarily in a frame, the end bars 13 and 14 of which are connected by guide rods 15, and the framing members 16 and 17, the latter being provided with calibrations 18, said calibrations corresponding with the calibrations 19 on the scalebeam 10. The bar 13 provides a sliding bearing for the rider carrier 20. One end of the rider carrier 20 has a knurled head 21 and is supported at the opposite end in bearings formed in sliding brace 22. The rider carrier 20 is held in permanent relation to the brace 22, by set collars 23 and 24.

The brace 22 is slidably mounted on the guide rods 15, being adapted to be moved lengthwise thereof by the rider carrier 20. Adjacent the brace 22, the rider carrier 20 is perforated to permit the extension therethrough of a rider hook 25.

As seen best in Fig. 2 of the drawings, the rider hook 25 has the hooked extremity 26 sufficiently extended to engage an eyelet 27 of the movable rider 28. Adjacent the extremity 26, the rider hook 25 has a guard 29.

The brace 22 has permanently attached thereto a short section vernier plate 30. As seen best in Fig. 3 of the drawings, the vernier plate 30 is juxtaposed to be read in coöperation with the calibrations 18 on the framing member 17. The zero point on said vernier plate is disposed in the same vertical plane as the center of the rider hook 25. The rider carrier 20 is adjusted in its retracted position by set screws 31, so that the zero mark on the vernier plate 30 coincides with the zero mark on the calibrations 18 on the framing member 17 and with the zero mark on the scalebeam 10.

When using a scales constructed in accordance with the present invention, the attendant engages the knurled head 21 of the carrier 20 and rocks the carrier to lift the hook 25 from the position shown by solid lines in Fig. 2 to the position shown by broken lines in the same figure. The hook 26 engages the eyelet 27 of the rider 28 to lift the same from the scalebeam 10. The carrier is now shifted to the position indicated by the approximate estimate of the weight. The usual method of advancing or retracting the rider lengthwise of the scalebeam is employed.

With highly sensitive scales, the correct balance often is obtained when the rider rests between two of the fractional divisions of the scale or calibrations 19. Heretofore the division of the division has been assumed by the person operating the scales. In accurate work this is unsatisfactory and it is to overcome the objection that the vernier plate 30 is used. When, now, the rider is placed between the divisions of the calibration 19, the decimal division of the location with reference to the division on the calibration 19 is ascertained by reading the vernier 30 on the calibration 18. The usual method of vernier reading is employed. Hence the person operating the scales is provided with means for assuming accurately the balancing weight.

While there has been shown a vernier plate having calibrations of ten divisions, it will be understood that this may be amplified and a larger number of divisions may be employed if desired.

Claims.

1. In a weighing scales, a graduated scalebeam adapted for the support of balance members superposed thereon; a weight carrier frame having a scale of graduations duplicating the graduations on said scale beam; a carrier mounted on said frame for placing said balance members, said carrier having a vernier member readable in correspondence with the graduations on said scalebeam for indicating the fractions of a division in said graduations where said balance members rest.

2. In a balance scales; a rocking scalebeam having a scale graduation adapted to support balance members when superposed thereon; a second scale duplicating the first-mentioned scale in exposed relation thereto; a rocking carrier slidably mounted between said graduations; and a vernier plate fixedly connected to said carrier to move lengthwise of said scale in correspondence with the movement of said carrier, said vernier having graduations to be read in conjunction with the second-mentioned graduations, the calibrations on said vernier plate registering with the zero markings of both of said graduations.

3. In a balance scales; a rocking scalebeam having a scale of graduations adapted to support balance members when superposed thereon; a second scale duplicating the first-mentioned scale in exposed relation thereto; a rocking carrier slidably mounted between said graduations; a vernier plate fixedly connected to said carrier to move lengthwise of said scale in correspondence with the movement of said carrier, said vernier having graduations to be read in conjunction with the second-mentioned graduations, the calibrations on said vernier plate registering with the zero markings of both of said graduations; and means for varying the zero adjustment of said carrier and vernier plate.

4. In a balance scales; a rocking scalebeam having a scale of graduations adapted to support balance members when superposed thereon; a second scale duplicating the first-mentioned scale in exposed relation thereto; a rocking carrier slidably mounted between said graduations; a vernier plate fixedly connected to said carrier to move lengthwise of said scale in correspondence with the movement of said carrier, said vernier plate having graduations to be read in conjunction with the second-mentioned graduations, the calibrations on said vernier plate registering with the zero markings on both of said graduations; and means for varying the zero adjustment of said carrier and vernier plate, said means embodying a brace slidably mounted in guides, said brace furnishing a bearing for said carrier, and adjustable positioning collars fixedly mounted on said carrier at opposite sides of said brace.

5. In a weighing scales; a rocking beam having a scale of graduations and adapted to support in superposed relation thereto, movable balancing members; a guide frame mounted in juxtaposed relation to said rocking beam, said guide frame having a second scale graduated in correspondence with the scale on said beam; a carrier slidably mounted in said frame for movement lengthwise thereof; and means provided on said carrier for engaging to lift and transfer said balance members; a vernier plate connected with said carrier and disposed in juxtaposed relation to the graduations on said frame to register therewith and to be read thereon for indicating the fractional division of the place of any of the balance members.

GEORGE G. VOLAND.
EMIL L. VOLAND.